United States Patent [19]

Kuss et al.

[11] 4,177,844
[45] Dec. 11, 1979

[54] SILO BREATHER BAG

[75] Inventors: Ralph L. Kuss; Jerry J. Hickle, both of Findlay, Ohio

[73] Assignee: Kuss Corporation, Findlay, Ohio

[21] Appl. No.: 945,226

[22] Filed: Sep. 25, 1978

[51] Int. Cl.² .......................... A45C 9/00; B65B 3/00; B65D 25/02
[52] U.S. Cl. ..................................... 150/1; 220/85 B; 99/646 S
[58] Field of Search .................. 150/0.5, 1; 99/646 R, 99/646 S; 220/85 B

[56] References Cited

U.S. PATENT DOCUMENTS

| | | | |
|---|---|---|---|
| 2,899,884 | 8/1959 | Herbruck | 220/85 B |
| 3,158,188 | 11/1964 | Esty | 150/1 |
| 3,193,058 | 7/1965 | Ebbinghaus | 99/646 S |
| 3,888,288 | 6/1975 | Hickle et al. | 150/1 |
| 4,135,443 | 1/1979 | Warren | 99/646 S |

Primary Examiner—George T. Hall
Attorney, Agent, or Firm—David D. Murray

[57] ABSTRACT

A breather bag for use in a sealed silo maintains pressure equilibrium between the inside and the outside of the silo by its volumetric change while preventing the ingestion of oxygen laden air. The breather bag is of generally arcuate or semi-circular shape and has a generally circular cross section. The breather bag includes at least one flexible conduit which extends between the breather bag and the silo roof and provides communication between the inside of the breather bag and the atmosphere. The breather bag is comprised of at least three plastic panels which are sealed together along overlapping edges. Two of the panels are a generally semi-circular shape and the third is a generally hourglass shape. A continuous hanger strap is sealed along the upper arcuate center line of the breather bag to facilitate hanging the bag within a silo. An alternate embodiment utilizes individual hanger pads disposed along the upper arcuate surface of the breather bag which performs the function of the hanger strap which they replace.

11 Claims, 11 Drawing Figures

SILO BREATHER BAG

BACKGROUND OF THE INVENTION

The invention relates generally to sealed silos and more particularly to air breather bags which maintain pressure equilibrium between the inside and the outside of the sealed silo. The silo is recognized as a fundamental development in the art of storing silage and fodder materials which are utilized as feed for various farm animals. It has been determined that the storage life of various silage and fodder feed is extended markedly by preserving such feed in an atmosphere devoid of oxygen. Recently, therefore, silos have been designed to be substantially airtight to prevent the ingestion of oxygen laden air. Such a sealed silo is manufactured by A. O. Smith Harvestore Products, Inc., of Arlington Heights, Ill.

Such sealed silos may be forty to as much as sixty feet high and have diameters from twenty to thirty feet. Basically, therefore, the structures define sealed cylinders. Since they are located out of doors, they are subject to wide variations in temperature, produced by both the sun's radiant energy and ambient conditions, as well as variations in the barometric pressure. Absent a structure to compensate for the variations in internal pressure, the walls of a sealed silo would be subjected to substantial hoop stresses when the internal pressure was above the ambient and, likewise, subjected to crushing and collapsing forces when the reverse condition was true. It was therefore appreciated that a pressure equalizing device which maintained the silo in a sealed condition must be incorporated thereinto.

Such a pressure equalizing device is the air breather bag of the instant invention. Numerous designs have been suggested. Early breather device patents teach the use of long rectangular plastic breather bags or toroidal bags having a semi-circular profile. A configuration which has become somewhat standard within the industry comprises two separate arcuate, half-toroidal sections each having a circular cross section. Each half toroidal section is hung near the top of the silo with its ends generally abutting the ends of the other breather bag. The use of two half-toroid bags not only minimizes replacement costs resulting from the failure of a portion of one breather bag but also facilitates their manufacture and installation. Alternatively, three bags, each subtending an arc of approximately 120°, may be desirable to further reduce individual cost and further facilitate manufacture.

The present sophistication of silo breather bags is the result of various attempts to improve the service life of such breather bags through the strategic location of seams along lines of low stress and sealing methods which inhibit stress concentrations. An early breather bag seam configuration comprehends the use of a plurality of axially abutting bands. Such a design often utilized as many as twelve plastic panels which were formed into hoops and subsequently axially aligned and sealed. Finally, circular end panels were secured to opposite ends of the generally toroidal breather bag. The resulting breather bag exhibited a high seam length to volume ratio and was subject to early failure which invariably occurred along a seam.

Another previous design is disclosed in U.S. Pat. No. 3,888,288 to Hickle and Sherbourne which discloses a half-toroidal breather bag which includes staggered non-coextensive sealed edges which have no more than three sealed panels contiguous at any one point.

SUMMARY OF THE INVENTION

The instant invention comprehends a plastic, half-toroidal silo breather bag having a circular cross section. The three breather bag embodiments disclosed herein all comprise at least three plastic panels which are cut according to a pattern described herein and sealed along overlapping edges. Two of the panels have a dimensionally identical semi-circular outline and the third is a generally hour-glass-like shape. The distinctions between the three embodiments are associated with the various hanger structures and methods of securing such structures to the breather bag. In the preferred embodiment, an arcuate segment adjacent the chordal edge of one of the semi-collar panels is removed, a hanger strap is sealed to the bag and a second, somewhat larger arcuate segment which replaces the just-removed segment is sealed in place. The hanger strap has a plurality of openings useful for hanging the silo breather bag on hooks disposed for such purpose within the silo.

In the first alternate embodiment the hanger strap is replaced by a plurality of individual tether pads or eyelets which may be attached to the semicircular panel forming the top of the breather bag without the segment removal and resealing steps associated with the preferred embodiment.

The second alternate embodiment also utilizes the hanger strap but rather than requiring the removal of a panel segment, the panel is slit along three radial lines in the area which corresponds generally to the removed segment of the preferred embodiment. These slits facilitate the attachment of the hanger strap and are subsequently resealed with patches.

The remaining structure and assembly steps are the same for all embodiments. Two breather conduits are sealed to the panel having the hanger strap or eyelets. Four hanger eyelets are then secured to the other semicircular panel along a line disposed similarly to the hanger strap or eyelets of the first semi-circular panel. Finally, the plastic panels are positioned with appropriate seams abutting and sealed by the application of high frequency energy.

The silo breather bag made in accordance with the foregoing has a low seam length to volume ratio and is thus less subject to seam fatigue and failure then conventional designs. Furthermore, the bag is assembled from a minimum number of segments and in the first alternate embodiment two of the three panels are identical.

It is an object of the instant invention to provide a pressure compensating silo breather bag which exhibits superior service life under extreme conditions of temperature, humidity and pressure.

It is a further object of the instant invention to provide a silo breather bag which incorporates a seam configuration having a low seam length to bag volume ratio.

It is a still further object of the invention to provide a silo breather bag having a minimum number of panels and seams which are also disposed along lines of minimum stress concentration.

Further objects and benefits of the instant invention will become apparent by reference to the following specification and attached drawings.

DESCRIPTION OF THE PREFERRED EMBODIMENT

Figure 1:
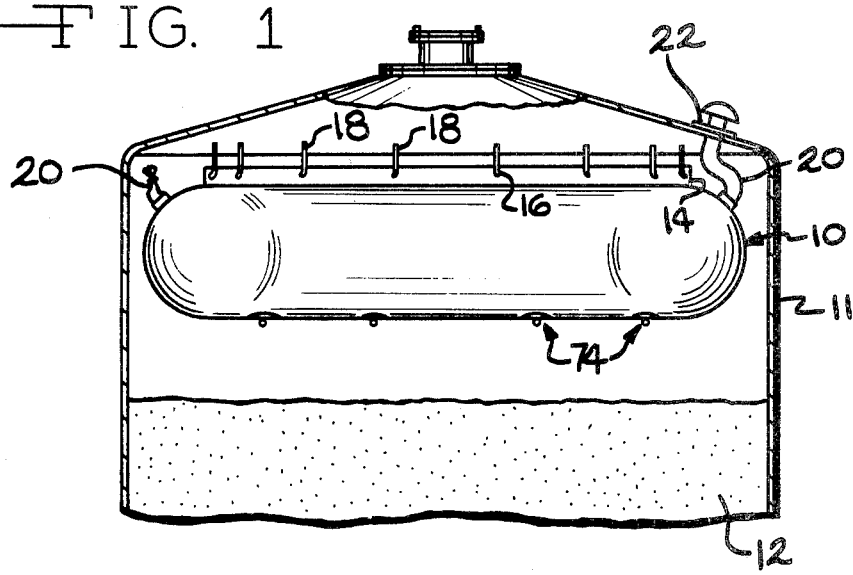
FIG. 1 is a side elevational sectional view of a sealed silo employing the instant breather bag invention.

Referring now to FIG. 1, a silo breather bag of the instant invention is generally designated by the reference numeral 10. The breather bag 10 is suspended within a sealed silo 11 which contains a quantity of ensilage, fodder or other stored material 12. Each of a pair of two such breather bags 10, having a half-toroidal shape with a circular cross section, includes a hanger strap 14 having a plurality of openings 16 located therein. The openings 16 in the strap 14 are engaged with a like plurality of hooks 18 secured to the inner structure of the silo 11 which suspend the silo breather bag 10 therein. Two breather conduits 20 are secured to the breather bag 10 about two openings 21 (shown in FIG. 2). The silo 11 includes a plurality of vent openings 22 to the atmosphere, one for each breather bag 10 to be installed therein. One of the conduits 20 of the breather bag 10 is sealed about one of the openings 22 and establishes communication between the interior of the bag 10 and the atmosphere. It is necessary to connect only one of the two conduits 20 of a bag 10 to one of the openings 22, preferably the one more proximate; the other conduit 20 may be tied off.

The pressure within the breather bag 10 is generally equal to that of the outside atmosphere. When the temperature and barometric conditions begin to change such that a pressure differential between the inside and the outside of the silo is incipient, air will be ingested or exhausted through the conduits 20 and into or from the interior of the silo bag 10 to maintain pressure equilibrium. For example, if the silo 11 is exposed to sunlight, the structure will warm and an incipient pressure increase within the silo 11 will result. As the air within the silo warms and expands, air is exhausted from the breather bag 10 to maintain equal pressure within and without the silo 11. Conversely, and more importantly, as the silo 11 cools, an internal incipient pressure decrease will result in the ingestion of air through the conduits 20 and into the interior of the breather bag 10, thereby maintaining this pressure equilibrium without permitting the outside air to mix with the air inside the silo. The ingestion of air into the silo 11 due to a lower pressure within the silo than without highlights the utility and necessity of the silo breather bag 10 since, without it, oxygen laden air would be ingested into the silo 11 and hasten the deterioration of the ensilage or fodder 12 contained therein.

It is possible that the volumetric compensation which the breather bag 10 may accomplish is insufficient to ingest or exhale sufficient air to establish a pressure equilibrium between the inside and the outside of the silo 11. When this occurs, the breather bag will resiliently and harmlessly expand in an attempt to achieve pressure equilibrium. While it is clear that the resilient expansion of the bag indicates that pressure equilibrium has not been achieved (i.e., that a pressure differential does exist between the inside and the outside of the silo), it has been found that the volumetric compensation available through the use of such a silo breather bag is sufficient to at least limit the maximum pressure differential experienced under normal circumstances such that neither minor damages such as wrinkling or stress cracking nor major damage such as implosion or explosion of the silo will occur.

Figure 2:
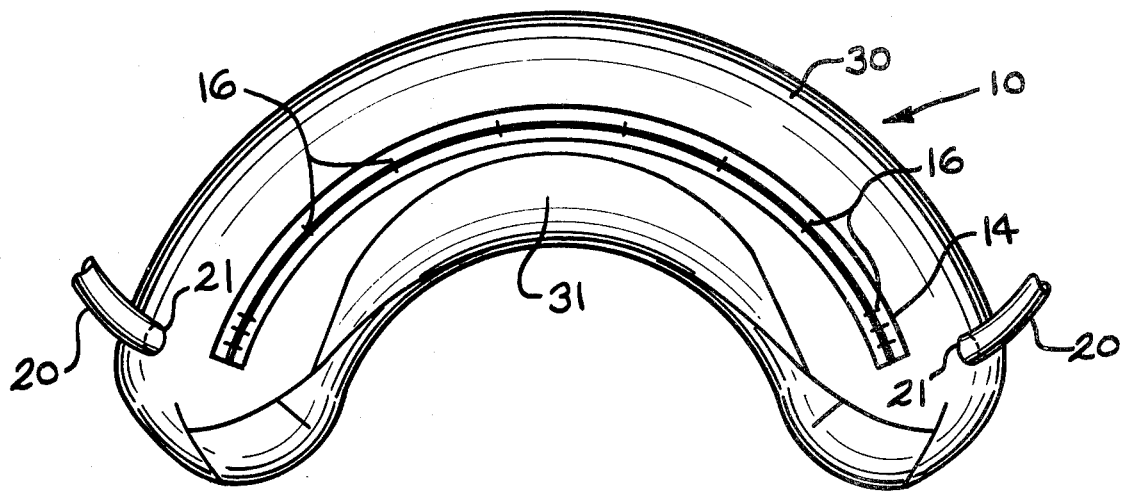
FIG. 2 is a top plan view of a silo breather bag of the instant invention.

FIG. 2 illustrates the silo breather bag 10 in plan view. Arcuately disposed along the upper center line of the breather bag 10 is the hanger strap 14. The hanger strap 14 includes a plurality of openings 16 usable to hang the breather bag 10 within a silo as has been previously described. The hanger strap 14 is preferably secured to the breather bag 10, proper, through the use of high frequency energy sealing techniques well known in the art.

Figure 3:
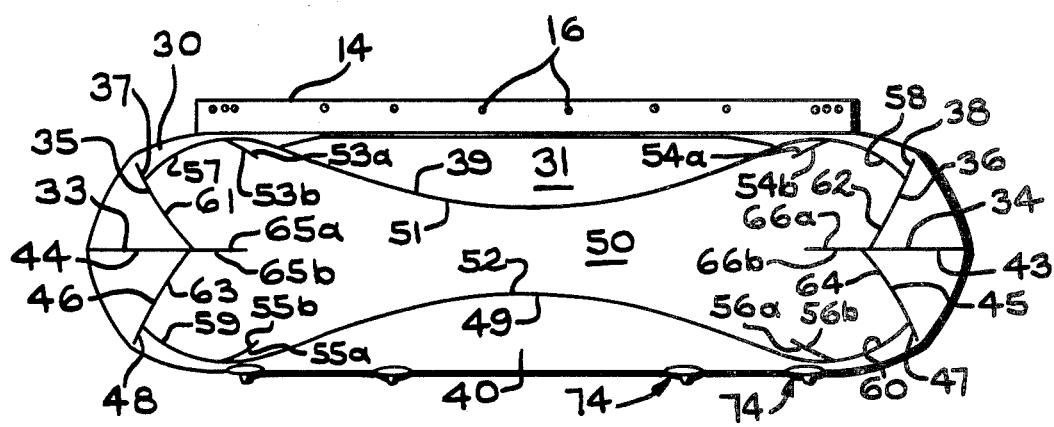
FIG. 3 is a side elevational view of a silo breather bag of the instant invention.

Referring to FIGS. 2 and 3, the panel and seam location can be readily seen. The upper generally semi-circular panel 30 defines an arcuate cutout which is removed to facilitate the attachment of the hanger strap 14. An arcuate insert 31, slightly larger than the cutout is subsequently positioned thereover and sealed to the panel 30. A lower semi-circular panel 40 is symmetrically positioned relative to the panel 30 but includes neither the cutout nor the insert 31 corresponding to the structures in the panel 30. The fourth panel, an hourglass shaped inner panel 50, completes the breather bag 10 and joins the upper panel 30 and lower panel 40 in the region of the concave, vertical sidewall.

Figure 4:
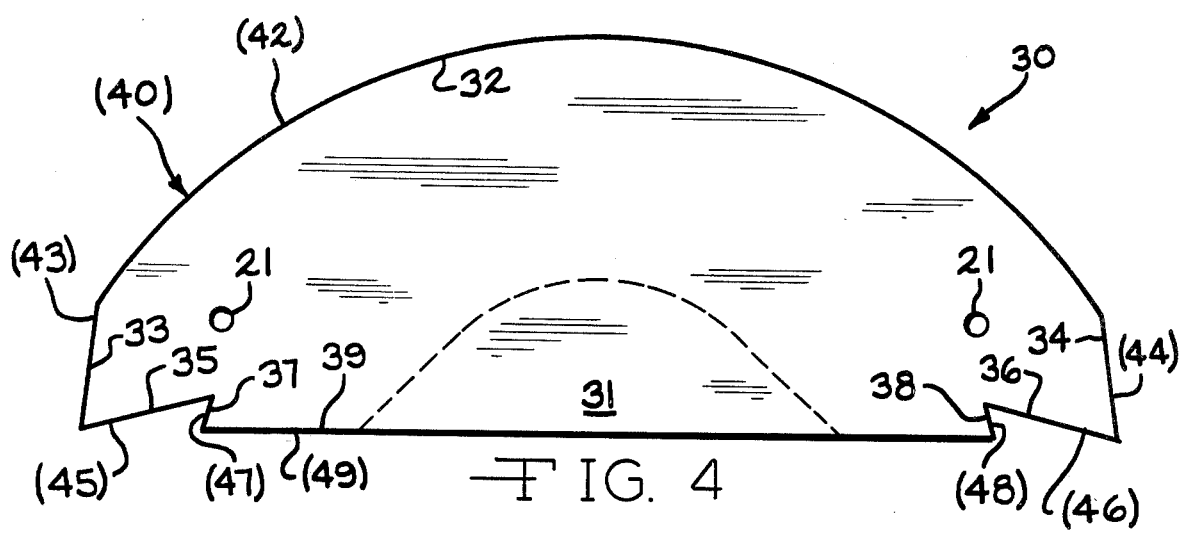
FIG. 4 is a plan view of the top and bottom semi-circular panel, the inner arcuate line representing the cutout and insert in the top panel of the preferred embodiment only which facilitates the attachment of the breather bag hanger strap.

Referring now to FIG. 4, the upper panel 30 which is substantially identical to the lower panel 40 is illustrated in flat pre-assembly configuration. The upper panel 30 defines two openings 21 about which the breather conduits 20 are sealingly attached. The upper panel 30 is basically of semi-circular configuration and includes a semi-circular edge 32 having truncated terminal portions 33 and 34 which meet with edges 35 and 36, respectively, at an acute angle. The edges 35 and 36 likewise intersect a dart edge 37 and 38, respectively, at an acute angle. The dart edges 37 and 38 are joined by the chordal edge 39.

The lower breather bag panel 40 is of the same outline and dimensions as the upper panel 30. There are two distinctions, however. First, the two openings 21 for the breather conduits 20 are not present in the bottom panel 40. Secondly, the cutout and insert 31 are not needed inasmuch as no hanger strap is sealed to the lower panel 40. The numeral 40, in FIG. 4, designates the lower panel and the numerals 42–49 placed on the illustration outside the panel outline refer to the edges of the bottom panel 40 which correspond to the edges 32–39 of the top panel 30. Again, there is no numeral 41 since an insert corresponding to the insert 31 is not required in the lower panel 40.

Figure 5:
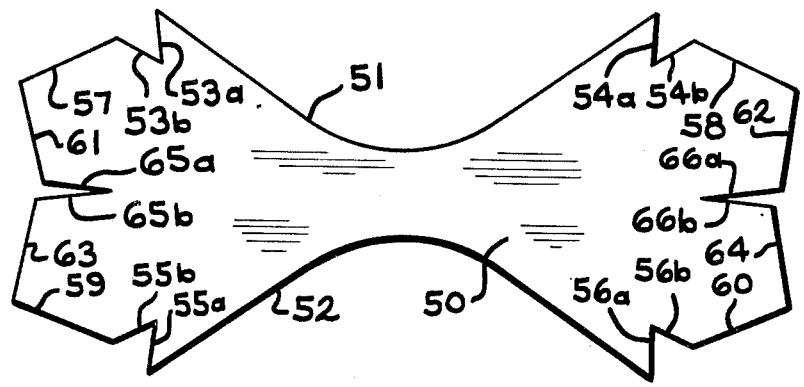
FIG. 5 is a plan view of the hour-glass panel of the silo breather bag of the instant invention.

Referring now to FIG. 5, the outline of the hour-glass shaped panel 50 is illustrated. Basically, the panel 50 comprises two vertically and horizontally symmetrical parabolic edges 51 and 52. The two parabolic edges 51 and 52 each intersect two dart edges 53A and 54A and 55A and 56A, respectively, at an acute angle. Disposed at an acute angle to the four dart edges 53A, 54A, 55A and 56A are four adjacent dart edges 53B, 54B, 55B and 56B, respectively. Intersecting the four dart edges 53B, 54B, 55B and 56B at an obtuse angle are four edges 57, 58, 59 and 60, respectively. Disposed at an obtuse angle to the four edges 57, 58, 59 and 60 are four terminal edges 61, 62, 63 and 64, respectively. Adjacent and connecting the two edges 61 and 63 is a non-symmetrical dart comprised of two edges 65A and 65B. Likewise, adjacent and connecting the two edges 62 and 64 is a non-symmetrical dart having two edges 66A and 66B.

Figure 8:
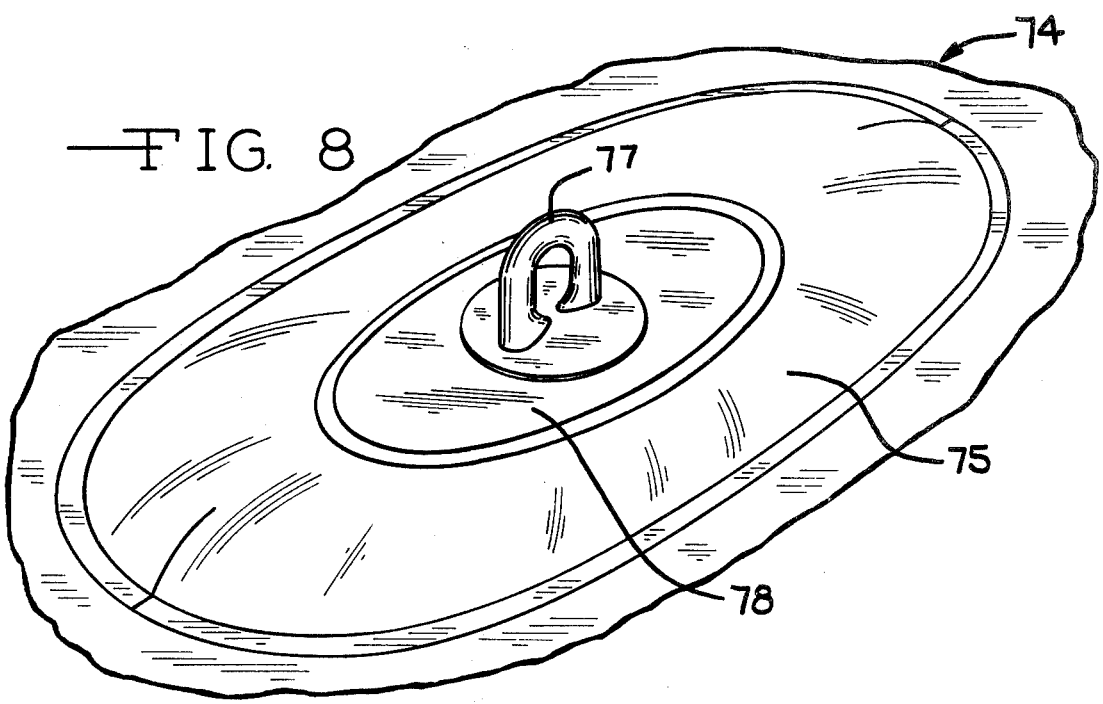
FIG. 8 is an enlarged perspective view of a tether eyelet assembly of the instant invention.
Figure 9:
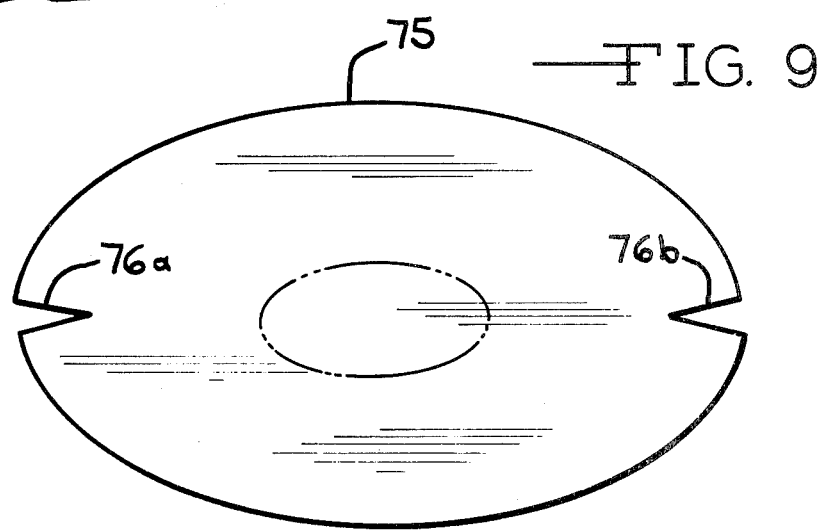
FIG. 9 is a plan view of a plastic panel utilized in the tether eyelet assembly of the instant invention.

Referring to FIGS. 3, 8 and 9, the breather bag 10 also includes a plurality of tether eyelet assemblies 74. The tether eyelet assemblies 74 are used to draw the bag away from the center of the silo 11 to facilitate loading. The tether eyelet assemblies 74 comprise a generally oval or elliptical panel of plastic 75 having two inwardly directed darts 76A and 76B symmetrically disposed about the intersection of the major axis of the panel 75 with its edge, as is seen in FIG. 9. The elliptical panel 75 is given a third dimensional or height aspect by the overlapping and sealing of the adjacent edges of the opposed darts 76A and 76B. A plastic eyelet 77 having a generally elliptical stress dispersing washer 78 is in turn secured to the plastic panel 75.

The manner of construction of the breather bag is as follows. Referring to FIGS. 2, 3 and 4, the cutout generally defined by the arcuate insert 31 is removed from the top panel 30 and the hanger strap 14 is sealed thereto. Then, the insert 31 is overlapped and sealed to the top panel 30. The openings 21 for the two breather conduits 20 are cut and the conduits 20 are installed. Next, the edge 37 is overlapped and sealed along its length to a portion of the edge 35 and likewise the edge 38 is overlapped and sealed along its length to a portion of the edge 36. In an identical fashion, the edge 47 of the bottom panel 40 is overlapped and sealed along its length to a portion of the edge 45 and the edge 48 is overlapped and sealed along its length to a portion of the edge 46. The tether eyelet assemblies 74 are affixed to the bottom panel 40 at this time.

Referring next to FIGS. 5 and 3, the hour-glass segment 50 is prepared. The four dart edges 53A and 53B, 54A and 54B, 55A and 55B and 56A and 56B are overlapped and sealed along their lengths. Likewise, the non-symmetrical dart edges 65A and 65B and 66A and 66B are overlapped and sealed.

Referring now to FIGS. 2 and 3, the upper panel 30 is positioned with its chordal edge 39 generally coincident with and slightly overlapping the three edges 51, 57 and 58 of the hour-glass panel 50 and sealed thereto. Likewise, the lower panel 40 is positioned with its edge 49 coincident with and overlapping the edges 52, 59 and 60 and sealed thereto. Next, the generally spherical ends of the breather bag 10 are formed by overlapping and sealing the following pairs of edges: 35 and 61; 36 and 62; 45 and 64; and 46 and 63. Finally, the full length seal along the convex outer periphery of the breather bag 10, comprised of the edges 32 and 42, is sealed by placing these edges in overlapping coincidence and applying sealing energy.

It will be appreciated that the breather bag manufactured according to the preceding description exhibits extended service life due to two features. First, the upper panel 30, the insert 31, the lower panel 40 and the hour-glass panel 50, shaped and cut according to this description, provide a highly accurate development of a half-toroid having generally spherical ends and a circular cross section. The panels thus accurately conform to the regular geometric shape the bag 10 assumes when it is inflated. Wrinkles, folds and excess material are therefore minimized. Secondly, and most importantly, the seams in the breather bag 10 are in regions of low stress concentration and thus are less subject to such stresses and eventual failure caused thereby than are breather bags constructed according to previous designs. It is a further consideration that this design minimizes the total length of lineal seam which further improves life. The seam length to volume ratio of the instant design is low.

A first alternate embodiment of the instant invention is illustrated in FIGS. 6–9. In FIG. 5, a breather bag 70 is illustrated which comprises an upper panel 71 identical to the upper panel 30 illustrated in FIG. 4 except that due to a unique hanger design, the cutout and arcuate insert 31 of the preferred embodiment are not required. The breather bag 70 also includes a bottom panel 72 which is identical in all respects to the bottom panel 40, illustrated in FIG. 4. The breather bag 70 further includes two breather conduits 20 which in structure and function are identical to the like numbered components of the preferred embodiment. The third panel of the first alternate embodiment breather bag 70 is an hour-glass panel 73 which is identical in all respects to the hour-glass panel 50 illustrated in FIG. 5. It should be apparent that the alternate embodiment requires a total of only three panels of plastic material. Furthermore and more importantly, the panels 71, 72 and 73 undergo no intermediate steps, that is, they need only be cut to the outlines illustrated in FIGS. 4 and 5 and sealed together along the appropriate edges. Finally, it should be clear that the first alternate embodiment of the breather bag 70 requires only two different shapes of panels since the top panel 71 and the bottom panel 72 are in all respects identical.

Figure 6:
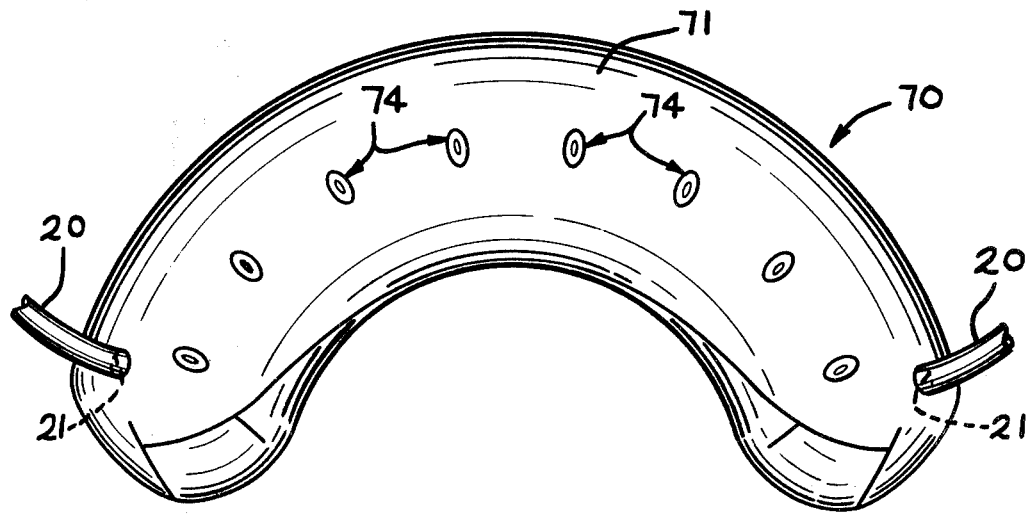
FIG. 6 is a top plan view of a silo breather bag according to a first alternate embodiment of the instant invention.
Figure 7:
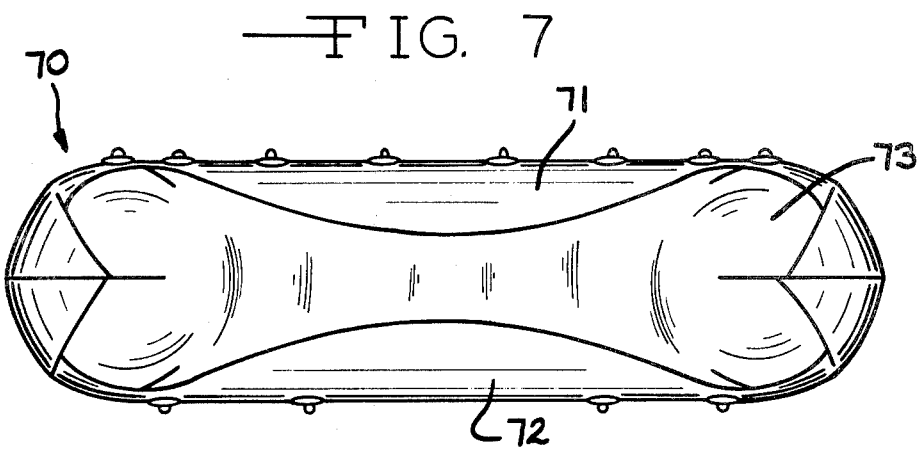
FIG. 7 is a side elevational view of a silo breather bag according to the first alternate embodiment of the instant invention.

Referring to FIG. 8, the first alternate embodiment 70 of the breather bag 10 further comprehends the inclusion of a plurality of tether eyelet assemblies 74. The tether eyelet assemblies 74 comprise a generally oval or elliptical panel of plastic 75 having two inwardly directed darts 76A and 76B symmetrically disposed about the intersection of the major axis of the panel 75 with its edge, as is seen in FIG. 9. The elliptical panel 75 is given a third dimensional or height aspect by the overlapping and sealing of the adjacent edges of the opposed darts 76A and 76B. A plastic eyelet 77 having a generally elliptical stress dispersing washer 78 is in turn secured to the plastic panel 75. The hanger assemblies 74 are then attached to the arcuate center lines of the upper and lower panels 71 and 72 as illustrated in FIGS. 6 and 7. The final assembly of a silo breather bag 70 according to the first alternate embodiment follows the same steps as have been recited in connection with the assembly of the preferred embodiment and thus will not be here repeated.

Figure 10:
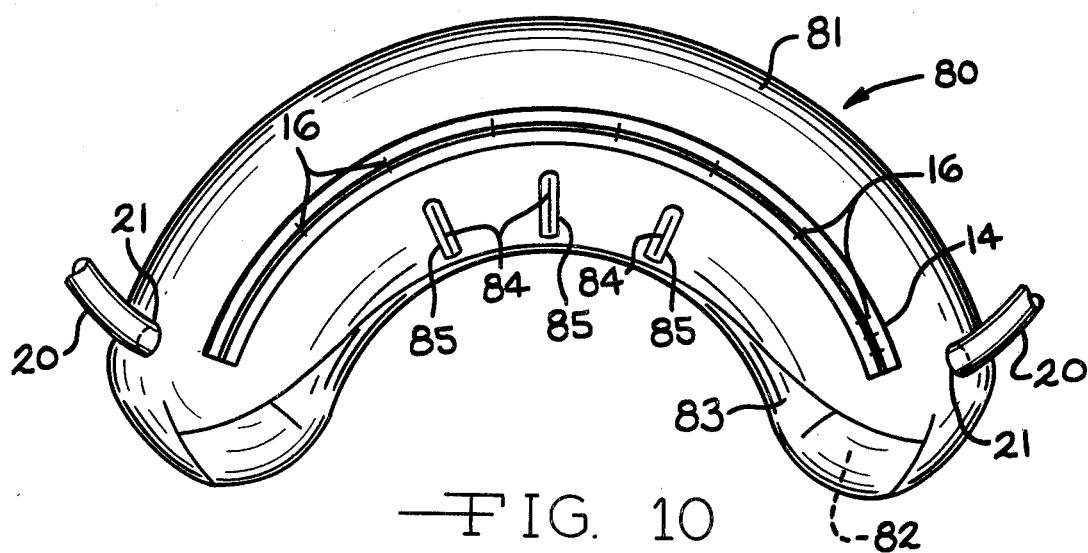
FIG. 10 is a top plan view of a silo breather bag according to a second alternate embodiment of the instant invention.
Figure 11:
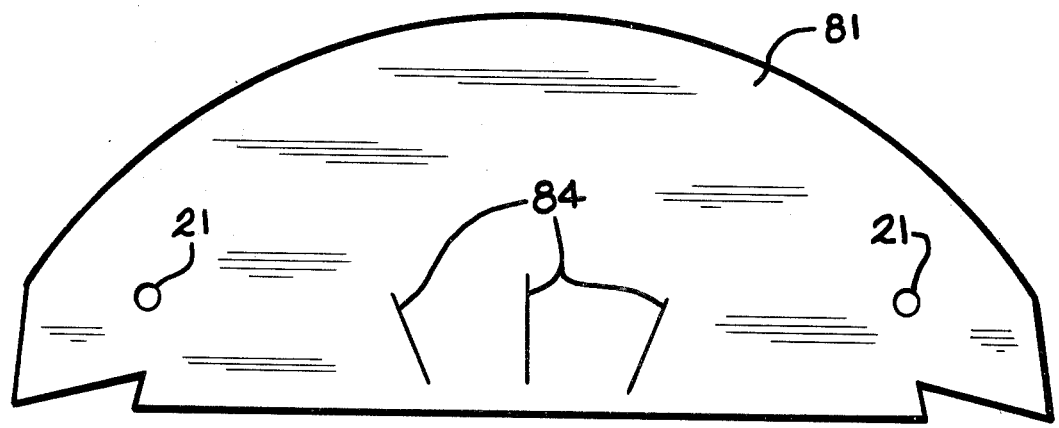
FIG. 11 is a plan view of the top semi-circular panel according to the second alternate embodiment of the instant invention.

A second alternate embodiment is illustrated in FIGS. 10 and 11. As in the first alternate embodiment the deviation from the structure of the preferred embodiment centers on the preparation of the top panel prior to the attachment of the hanger means. A second alternate embodiment of a silo breather bag 80 comprises a top panel 81, a bottom panel 82 and an hourglass panel 83 having flat preassembly configurations and assembled seam locations which correspond to those of the preferred embodiment and first alternate embodiments of the silo breather bag of the instant invention.

The breather bag 80 likewise includes two breather conduits 20 which in structure and function are identical to the like numbered components of the preferred and first alternate embodiments. The breather bag 80 further includes a hanger strap 16 disposed along the arcuate center line of the top panel 81 in a manner identical to the preferred embodiment. The breather bag 80 further includes a plurality of tether eyelet assemblies 74 disposed along the arcuate center line of the bottom panel 82. (The eyelet assemblies 74 are not visible in FIG. 10 but are visible in and are disposed as illustrated in FIGS. 1 and 3.)

To facilitate the attachment of the hanger strap 16, the top panel 81 is prepared by cutting three radial slits 84 therein near its chordal edge. The plastic panel 81 may then be folded and maneuvered into positions which facilitate the attachment of the hanger strap 16. Subsequent to the attachment of the strap 16, the top panel 81 is spread flat and the three radial slits 84 are each resealed with an oblong patch 85. Final assembly of the breather bag 80 coincides with those steps previously enumerated with regard to the preferred embodiment.

It will be apparent that the two alternate embodiments just described exhibit the same advantages regarding extended service life as the preferred embodiment does inasmuch as they incorporate the same accurate half-toroid development, the same low stress concentration at the seams and substantially the same low seam length to volume ratio.

It will be apparent to those skilled in the art that various modifications may be made to the preferred embodiment described above without departing from the spirit and scope of the following claims.

What we claim is:

1. A bag adaptable for use in sealed structures to maintain pressure equilibrium comprising, in flat preassembly configuration, two generally semi-circular panels, both of said panels having a generally semi-circular edge with truncated end edges intersecting a notched chordal edge and said truncated end edges intersecting at an acute angle, a third panel having a generally hour-glass shape with two opposed generally arcuate edges, terminal portions of each of said arcuate edges defining one edge of an acute angle projection, the other edge of each of said acute angle projections intersecting one edge of an irregular flap at an acute angle, each of said irregular flaps defining one edge of an inwardly directed notch having edges of unequal length, whereby in assembled configuration, said semi-circular and truncated edges of one of said semi-circular panels are sealed to corresponding edges of said other of said semi-circular panels, said arcuate edges of said hour-glass-like panel are sealed to said chordal edges of said semi-circular panels and said projection, notch and flap edges are sealed to adjacent corresponding edges.

2. A silo breather bag for use in a sealed silo comprising, in flat preassembly configuration, two generally semi-circular panels, both of said panels having a generally semi-circular edge with truncated end edges intersecting a notched chordal edge having inwardly cut notch edges, said notched chordal edge and said truncated end edges intersecting at an acute angle; one of said panels including a resealed polygonal segment adjacent said chordal edge and suspension means for hanging said bag within the sealed silo and a third panel having a general hour-glass shape with two opposed generally arcuate edges, the terminal portions of each of said arcuate edges defining one edge of an acute angle projection, the other edge of each of said acute angle projections intersecting one edge of an irregular four-edged flap at an acute angle, each of said irregular flaps defining one edge of an inwardly directed notch having edges of unequal length, whereby, in assembled configuration, said semi-circular and truncated edges of one of said semi-circular panels are sealed to corresponding edges of said other of said semi-circular panels, said arcuate edges of said hour-glass-like panel are sealed to said chordal edges of said semi-circular panels and said projection, notch and flap edges are sealed to adjacent corresponding edges.

3. The silo breather bag of claim 2, further including a plurality of tether eyelets secured to the other of said semi-circular panels.

4. The silo breather bag of claim 2, further including at least one vent conduit and wherein said one of said panels defines at least one vent opening therein and said vent conduit is secured thereabout.

5. The silo breather bag of claim 2, wherein said suspension means comprises a hanger strap having a plurality of openings engagable by hooks depending from the interior of the sealed silo.

6. A silo breather bag for use in a sealed silo comprising, in flat preassembly configuration, two generally semi-circular panels, both of said panels having a generally semi-circular edge with truncated end edges intersecting a notched chordal edge having inwardly cut notch edges, said notched chordal edge and said truncated end edges intersecting at an acute angle; one of said panels having at least one vent opening defined therein, a vent conduit secured to said panel about said vent opening, an arcuate insert adjacent said chordal edge and a hanger strap secured to said panel in an arcuate curve between said semi-circular edge and said arcuate insert, and a third panel having a generally hour-glass shape with two opposed generally arcuate edges, terminal portions of each of said arcuate edges defining one edge of an acute angle projection, the other edge of each of said acute angle projections intersecting one edge of an irregular four-edged flap at an acute angle, each of said irregular flaps defining one edge of an inwardly directed notch having edges of unequal length, whereby, in assembled configuration, said semi-circular and truncated edges of one of said semi-circular panels are sealed to corresponding edges of said other of said semi-circular panels, said arcuate edges of said hour-glass-like panel are sealed to said chordal edges of said semi-circular panels and said projection, notch and flap edges are sealed to adjacent corresponding edges.

7. A silo breather bag for use in a sealed silo comprising, in flat preassembly configuration, two generally semi-circular panels, both of said panels having a semi-circular edge with truncated end edges intersecting a notched chordal edge having inwardly cut notch edges, said notched chordal edge and said truncated end edges intersecting at an acute angle; one of said panels having a plurality of tether eyelets secured to said one of said panels in a generally arcuate curve, a third panel having a generally hour-glass shape with two opposed generally arcuate edges, terminal portions of each of said arcuate edges defining one edge of an acute angle projection, the other edge of each of said acute angle projections intersecting one edge of an irregular four-edged flap at an acute angle, each of said irregular flaps defining one edge of an inwardly directed notch having edges of unequal length, whereby in assembled configuration said breather bag defines a partial toroid of generally circular cross section having said semi-circular and truncated edges of one of said semi-circular panels sealed to corresponding edges of said other of said semi-circular panels, said arcuate edges of said hour-glass-like panel sealed to said chordal edges of said semi-circular panels and said projection, notch and flap edges sealed to adjacent corresponding edges.

8. The silo breather bag of claim 7, further including at least one vent conduit and wherein said one of said panels defines at least one vent opening therein and said vent conduit is secured thereabout.

9. The silo breather bag of claim 8, wherein said vent conduit is in communication with the atmosphere external to the sealed silo.

10. The silo breather bag of claim 7, further including a plurality of tether eyelets secured to the other of said semi-circular panels.

11. A silo breather bag for use in a sealed silo comprising, in flat preassembly configuration, two generally semi-circular panels, both of said panels having a generally semi-circular edge with truncated end edges intersecting a notched chordal edge having inwardly cut notch edges, said notched chordal edge and said truncated end edges intersecting at an acute angle, one of said panels having at least one vent opening defined therein, a vent conduit secured to said panel about said vent opening, a plurality of resealed radial slits adjacent said chordal edge and a hanger strap secured to said panel in an arcuate curve between said semi-circular edge and said resealed radial slits, and a third panel having a generally hour-glass shape with two opposed generally arcuate edges, terminal portions of said arcuate edges defining one edge of an acute angle projection, the other edge of said acute angle projections intersecting one edge of an irregular four-edged flap at an acute angle, each of said irregular flaps defining one edge of an inwardly directed notch having edges of unequal length, whereby, in assembled configuration, said semi-circular and truncated edges of one of said semi-circular panels are sealed to corresponding edges of said other of said semi-circular panels, said arcuate edges of said hour-glass-like panel are sealed to said chordal edges of said semi-circular panels and said projection, notch and flap edges are sealed to adjacent corresponding edges.

* * * * *